United States Patent [19]
Young, Sr.; James

[11] Patent Number: 5,460,104
[45] Date of Patent: Oct. 24, 1995

[54] STOWABLE TABLE

[76] Inventor: James Young, Sr., R.R. 1, Box 148A, El Paso, Ill. 61738

[21] Appl. No.: 195,384

[22] Filed: Feb. 14, 1994

[51] Int. Cl.[6] ................................................ A47B 3/00
[52] U.S. Cl. ...................... 108/115; 297/144; 248/398; 108/144
[58] Field of Search ........................ 108/115, 116, 108/117, 144; 297/144, 145, 155; 248/166, 398, 188.1

[56] References Cited

U.S. PATENT DOCUMENTS

| | | | |
|---|---|---|---|
| 616,296 | 12/1898 | Dennis | 108/11 |
| 862,818 | 8/1907 | Hallaren | 108/116 X |
| 1,489,101 | 4/1924 | Sefl . | |
| 2,709,818 | 6/1955 | Freese | 108/144 X |
| 3,418,950 | 12/1968 | Hubbell et al. | 297/140 X |
| 4,341,418 | 7/1982 | Chappell . | |
| 4,677,919 | 7/1987 | Baggiani | 108/144 X |
| 4,852,940 | 8/1989 | Kanigowski . | |
| 4,947,763 | 8/1990 | Piorek | 108/144 X |
| 5,035,464 | 7/1991 | Spallholtz . | |
| 5,069,142 | 12/1991 | Matre | 108/115 X |
| 5,129,702 | 7/1992 | Ervin . | |

FOREIGN PATENT DOCUMENTS

| | | | |
|---|---|---|---|
| 965136 | 3/1975 | Canada | 108/144 |
| 2523826 | 9/1983 | France | 108/115 |
| 2757596 | 6/1979 | Germany | 108/144 |

Primary Examiner—Kenneth J. Dorner
Assistant Examiner—Janet M. Wilkens
Attorney, Agent, or Firm—Emrich & Dithmar

[57] ABSTRACT

A stowable table for use in a recreational vehicle has a base adapted to be mounted beneath a couch or other furniture item. A curved leg is slidably received in correspondingly curved support slots in the base so that the leg can be slid and rotated about a horizontal axis between a lowered, storage position and an upright, use position in which the top is horizontal to form a table.

12 Claims, 2 Drawing Sheets

STOWABLE TABLE

FIELD OF THE INVENTION

The present invention relates to a novel table; and more particularly, it relates to a table adapted to be stored when not in use. The present invention has particularly application for recreational vehicles, vans, boats, semi-trailers, but its application extends also to homes and offices where it is desired to store a table top surface when the table is not being used.

BACKGROUND OF THE INVENTION

Stowable tables have been proposed, but for the most part, they have depended upon complex metal linkages for moving the table top between a stowed position and the use position. These mechanisms are not only expensive, but they require rather elaborate mounting hardware; and they are subject to malfunction over a long use period, particularly if any of the linkages become bent out of shape or the metal pivots become rusted. Further, metal linkages of the type which have been proposed in the past are expensive to manufacture and are not aesthetically pleasing. A further disadvantage of some prior art stowable tables is that the mechanism for moving the table top between the storage position and the use position also includes some means for storing the table top in a horizontal position. This further complicates the movement mechanism, and requires a spacious storage area.

SUMMARY OF THE INVENTION

The present invention is for a stowable table having a base which may be mounted to the floor or it may be mounted beneath a piece of furniture, such as a sofa, or it may be mounted within a wall cabinet. The base includes a pair of curved support slots. Where the base is wood, the curved support slots may be dadoes.

A curved leg, the curvature of which corresponds to the curvature of the support slots in the base, is slidably received in the support slots of the base, and it is adapted to be moved between a raised, use position and a lowered, storage position by sliding the support leg within the curved slots in the base.

A table top is mounted to the top of the curved leg. The table top may be a folding top, hinged along its center. The table top assumes a horizontal position when the curved leg is moved to the use position, and the table top assumes a vertical storage position when the leg is lowered. Before lowering the table to the storage position, the top is folded so that it assumes a smaller area, and in the illustrated embodiment, when the table top is placed in the storage position, it forms a vertical kick board or protective closure beneath a sofa or other furniture piece.

A curved tongue is pivotally mounted to the curved leg of the table, and it, too, is moved between a use position and a stowed position. In the stowed position, the curved tongue conforms substantially to the shape of the curved leg and fits substantially within the leg to assume a reduced space for storage. However, when the table is raised to the use position, the tongue swings outwardly under gravity and performs two functions. First, it acts as a latch for securing the leg and table top in the raised position by engaging and bearing against the fixed base. Secondly, when the tongue swings to the use position, it angles away from the curved leg and acts as a stabilizing leg for the unfolded portion of the table top, securing it in a use position which is horizontally aligned with the matching section of the table top which is fixed to the top of the leg.

Other features and advantages of the present invention will be apparent to persons skilled in the art from the following detailed description of a preferred embodiment accompanied by the attached drawing wherein like reference numerals will refer to similar parts in the various views.

DETAILED DESCRIPTION OF A PREFERRED EMBODIMENT

Figure 1:
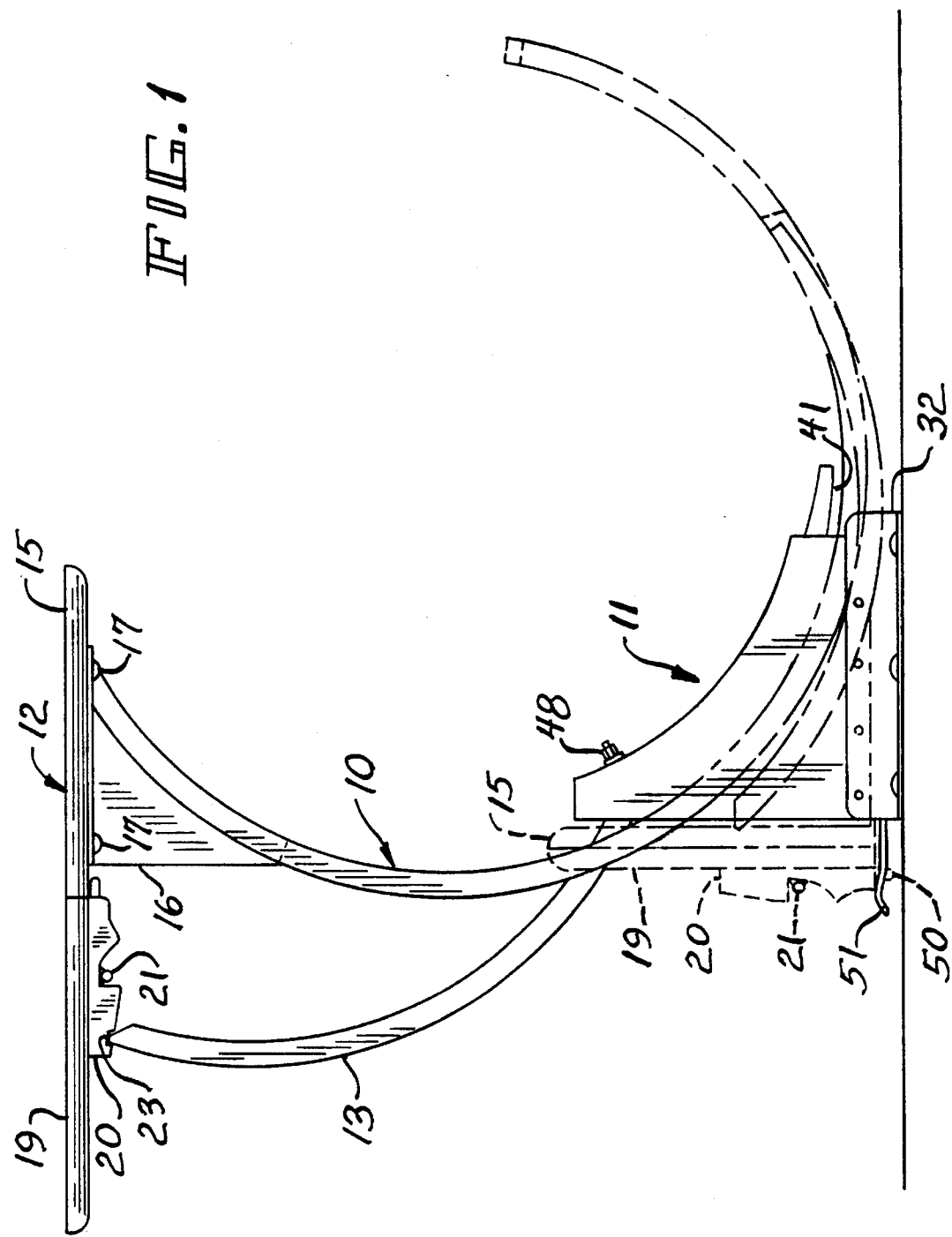
FIG. 1 is a side view of a stowable table incorporating the present invention, the table being shown in the raised position in solid line, and in the stowed position in chain line.

Turning first to FIG. 1, a table includes a curved leg generally designated 10, slidably received in a base 11. In the illustrated embodiment, the base 11 is secured to the floor, but it could equally well be secured to vertical walls, or to the frame of a movable piece of furniture.

The table also includes a table top generally designated 12. A curved tongue 13 is pivotally mounted to the curved leg 10, as will be described presently, and provides a support leg for one-half of the table top when the top is unfolded in the use position.

The table top of the illustrated embodiment includes a first section 15 which is rigidly secured to the top of the curved leg by means of a support brace 16 and conventional screws shown at 17. The table top includes a second section 19 which is hinged to the first section 15 so that in the use position shown in solid line in FIG. 1, the table top sections 15, 19 provide a horizontal use surface as seen in solid line, with section 19 supported by the curved tongue 13.

Figure 2:
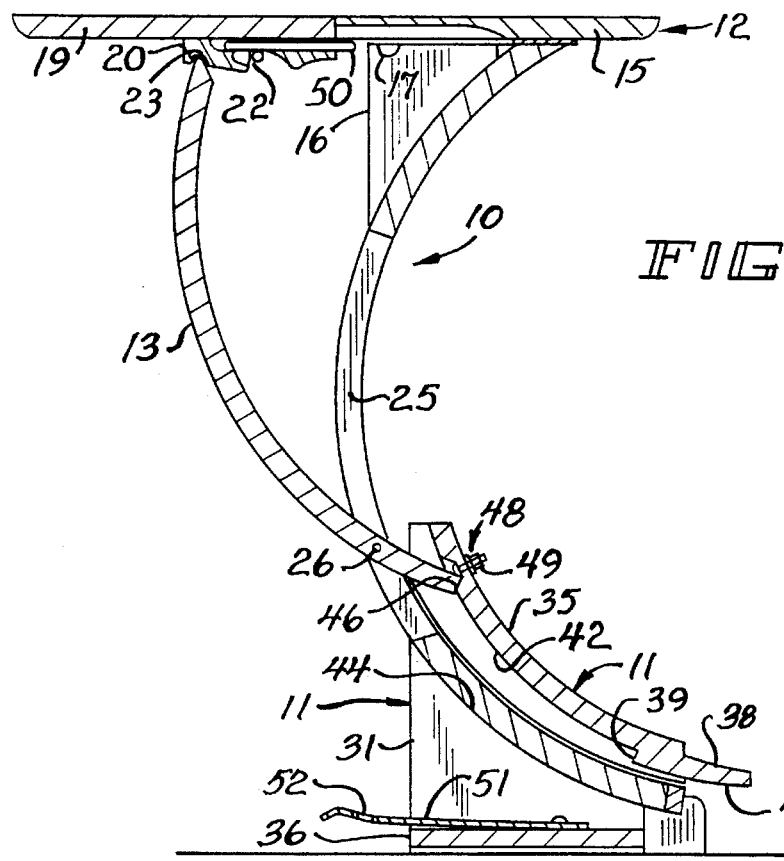
FIG. 2 is a vertical cross-sectional view of the table of FIG. 1, as seen from the side, and as taken along the site line 2—2 of FIG. 3.

Mounted beneath the table top section 19 is a wooden housing 20 for a latch member designated 21 (and seen better in FIG. 2 as slidable received within the housing 20). The wooden housing 20 also includes a finger recess (see reference numeral 22 in FIG. 2), and a laterally extending, downwardly-facing slot 23 for receiving the top of the curved tongue 13 in the use position, thereby supporting the folding table top section 19 in the horizontal use position.

Figure 3:
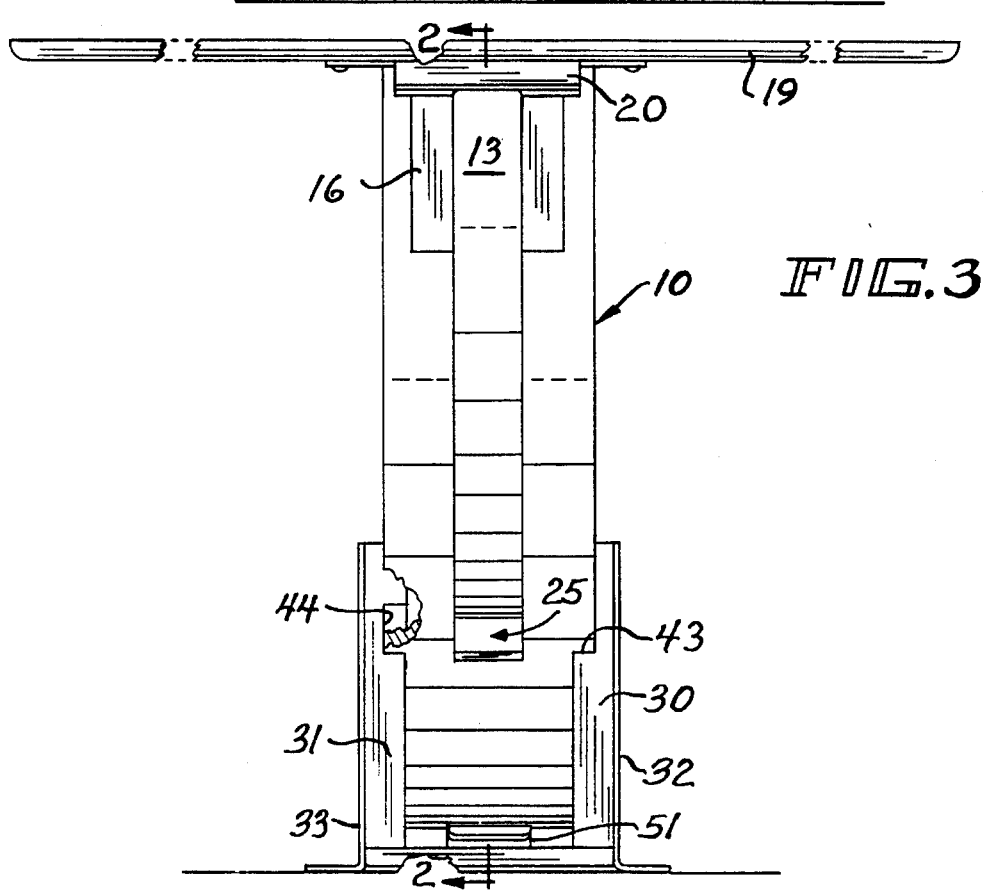
FIG. 3 is a frontal view of the table of FIG. 1 with portions broken away to view the support slots in the base and to shorten the lateral extension of the top.

Turning now to FIGS. 2 and 3, the leg 10 is shown as a solid, uniformly curved wooden section having a central opening or slot, designated 25 in FIG. 2. Alternatively, the leg assembly could be fabricated from two identical side sections, together with top and bottom joinder segments securing the side portions together and located above and below slot 25.

The tongue 13 is received in the slot 25 and pivoted at 26 to the side sections of the leg 10.

The base 11 includes first and second upright side walls 30, 31, to the outside of which floor mounting brackets 32, 33 are secured. The side walls 30, 31 of the base are secured together by a curved upper wall 35 and a flat bottom wall 36 to form a rigid base structure.

The base 11 also includes a guide member 38 which is secured to the bottom of the top wall 35. Referring to FIG. 2, the upper end of the guide member 38 forms a stop surface 39, the purpose of which will be explained below. Further, the lower surface 41 of guide member 38 is located slightly above the upper surface of the leg 10 in the storage position (shown in FIG. 1 in chain line). The purpose of the surface 41 of the guide member 38 is to engage the upper surface of lower portion of the tongue 13 of the leg assembly when the leg assembly is being positioned in or being retracted from the full storage position so as to guide the tongue 13 and to secure it as closely as reasonably practical to the leg 10 in storage, although as can be seen from FIG. 2, the tongue 13 cannot be coextensive with the leg assembly because the upper portion of the tongue 13 extends beyond the central slot 25 of the fixed portion of the leg. In the stowed position, the tongue 13 is pivoted clockwise in FIG. 2 about the pivot 26, guided by the formed surface 41 of guide member 38 to assume a substantially reduced space. Moreover, when the leg assembly is being retracted from the storage position, the upper surface of the tongue 13 slides along the formed surface 41 to control the pivoting of the tongue under gravity to the use position shown in FIG. 2 as the table is retracted from storage. It will also be observed from FIG. 2 that as the table continues to be opened, the right end of the tongue 13 rides along the curved undersurface 42 of top wall 35 of the base.

Turning now to FIG. 3, the inner surfaces of the vertical walls 30, 31 of the base are provided with curved support slots 43, 44. The curvature of the support slots 43, 44 corresponds to the curvature of the main portion of the leg 10, and each of the slots 43, 44 extends throughout its corresponding vertical wall of the base, as can best be seen in FIG. 2 for the slot 44. The lower surfaces of the slots 43, 44, support the main portion of the leg 10 in all positions of storage, transition and use.

The table is locked in the use position as seen in FIG. 2 by having the lower end of the pivoting tongue 13 fit into a slot 46 formed on the undersurface 42 of the curved top 35 of the base. The seating of the tongue 13 in the slot 46 is controlled by means of an adjustable stop generally designated 48 in FIG. 2 which is mounted to the upper portion of the top 35 of the base 11. The adjustable stop 48 may be in the form of a threaded fastener received in a nut embedded in the base and locked by means of a lock nut 49.

Still referring to FIG. 2, a metal latch plate 51 is mounted to the upper surface of the bottom wall 36 of the base, and it includes an opening designated 52 in FIG. 2 for receiving the pin 50 latch member 21 in the housing 20 on the foldable section 19 of the table top (shown in chain line in FIG. 1 in the use position).

The operation of the table is as follows. Referring to FIGS. 1 and 2, to place the table in the use position, the leg 10 is rotated clockwise by hand in the curved slots 43, 44 in the base to the position shown in solid line in FIG. 1. The finger slot 22 formed in the bottom of the housing 20 facilitates gripping of the table top in the folded position. As the leg is rotated from the full storage position shown in chain line, the surface 41 of the guide member 38 and the undersurface 42 of the top wall 35 control the rotation of the tongue 13 to the use position shown in FIG. 1. When the table is fully raised, the tongue 38 rotates to the full use position as the lower end of the tongue is received in the slot 46 and the upper end of the tongue is received in the slot 23 of housing 20 to lock the table in the raised position and prevent the leg from retracting back into the base. During the raising of the table, of course, the table top is folded, as seen in FIG. 1 in chain line.

To place the table back in the storage position, the top section 19 is rotated to rest on the top section 15, and the tongue 13 is rotated clockwise about the pivot 26 so that the bottom end of the tongue 13 clears the slot 46. The weight of the table then causes the curved table leg 10 to slide in the curved slots in the base, and the bottom of the tongue slides along the undersurface 42 of the top wall 35 until it engages the stop surface 39 of guide member 38. This is a safety feature which prevents full closing of the table until clothes and fingers are clear. The tongue is then rotated to clear the guide 38, and the tongue slides along surface 41 until the table is placed in the full storage position. The weight of the table is offset by the person moving it between the storage and use positions, although it would be possible, if desired, partially to offset the weight with springs.

As seen in FIG. 1, in the storage position, the leg 10 assumes the position shown in chain line at 10A, where it is low enough to fit beneath a piece of furniture; and the folded top sections 15, 19 assume a vertical position and can serve as a kickboard for the piece of furniture beneath which the table is stowed, if desired. The latch member 21 then falls under gravity so that the pin 50 of the latch is received in the slot 52 of the plate 51 to secure the table in the stowed position.

In one embodiment, the radius of curvature of the leg 10 and the tongue 13 as well as top wall 35 is approximately 13¼ inches. The center of curvature of the leg 10 becomes the center of rotation of the leg, and the table top rotates through an angle of 90° from use to storage.

Having thus disclosed in detail a preferred embodiment of the invention, persons skilled in the art will be able to modify certain of the structure which has been illustrated and to substitute equivalent elements for those disclosed while continuing to practice the principle of the invention. For example, the table top and leg assemblies may be made of solid wood if a quality piece of furniture is desired; or they may be made from laminate. The structure will work equally well, however, if the leg assembly is made of plastic or fabricated from tubular metal. Further, the base of the illustrated embodiment is adapted to mount the leg assembly to the floor, but other mounting bases or structures could equally well be designed to mount to vertical side walls, or to the bottom of a piece of transportable furniture. It is, therefore, intended that all such modifications and substitutions be covered as they are embraced within the spirit and scope of the appended claims.

I claim:

1. A stowable table comprising: a base adapted to be mounted to a support and including curved support means; a curved leg slidably received in said support means of said base, and movable between a raised use position and a lowered storage position; a top mounted to and carried by said leg and assuming a horizontal position when said leg is moved to said raised position, said top assuming a storage position adjacent said base when said leg is lowered; and releasable latch means for securing said leg in said raised position.

2. The table of claim 1 wherein said releasable latch means at least partially supports the weight of said top and secures said leg in the raised position by releasably engaging said base.

3. The table of claim 1 wherein said latch means is pivotally mounted to said leg and is received in a slot in said base when said table is in said raised position.

4. The table of claim 2 wherein said releasable latch means includes a support tongue pivotally mounted to said leg and movable between an outward position when said leg is raised, thereby to engage and support a portion of said table top in the use position, and a storage position in which said tongue is received in said base and is in substantial conformance with said curved leg.

5. The table of claim 4 wherein said table top comprises first and second half sections hinged about a line extending laterally of said table top, said second section rotating about said hinge above said first section for storage and rotatable about said hinge to an outward, horizontal position wherein the top surfaces of said first and second table sections are parallel, and wherein said second table top section rests on and is supported by said tongue in the use position.

6. The table of claim 5 further comprising means mounted to the lower surface of said second table top section and defining a recess for receiving and coupling to the upper end of said latch in the use position, thereby to secure said tongue in its extended, supporting position when said table top is unfolded.

7. The table of claim 6 wherein said support means of said table top section comprises a housing defining a slot for receiving and engaging the upper portion of said tongue, said housing further including a movable latch member adapted to secure the table top to said base when said table top is folded, said tongue is moved inwardly toward said leg and said leg is moved to said storage position.

8. The table of claim 7 wherein said leg defines a portion of a cylinder of substantially constant radius and having a horizontal axis, said base and leg cooperating such that said leg is moved in an arc centered on said axis between the use and storage positions.

9. The table of claim 8 further comprising a safety stop surface for engaging said tongue at an intermediate position between said raised and storage positions.

10. A stowable table comprising: a base adapted to be mounted to a support surface and having a curved slot support means; a curved leg having the same curvature as said slot means and slidably received in said slot means for arcuate movement of approximately 90° between a lowered storage position and a raised use position; a top mounted to and carried solely by said curved leg to assume a horizontal support position above said base when said leg is moved to said raised position and a generally vertical position aside said base in storage; and releasable latch means for securing said leg against said base when said leg is moved to the use position.

11. The table of claim 10 wherein said latch means comprises a curved tongue pivotally mounted to said curved leg and movable between an extended position wherein said tongue diverges from said curved leg, and a storage position wherein said tongue conforms generally to the shape of said leg, said tongue being adapted to engage and support said table top and to secure said curved leg against said base in the use position.

12. The table of claim 11 wherein said table top has first and second hinged sections, one of said hinged sections being secured to said leg and the other of said hinged section being movable to an extended position when said table is raised for use, and being supported by said tongue in the use position.

* * * * *